July 17, 1956  C. D. KIRBY  2,754,740
FLUID PRESSURE ADJUSTED IMPLEMENT
Filed April 21, 1952  3 Sheets-Sheet 2

Carl D. Kirby
INVENTOR.

BY *[signature]*
Attorneys

July 17, 1956  C. D. KIRBY  2,754,740
FLUID PRESSURE ADJUSTED IMPLEMENT
Filed April 21, 1952  3 Sheets-Sheet 3

Carl D. Kirby
INVENTOR.

United States Patent Office 2,754,740
Patented July 17, 1956

2,754,740

FLUID PRESSURE ADJUSTED IMPLEMENT

Carl D. Kirby, Lula, Miss., assignor to The KBH Corporation, a corporation of Mississippi Application April 21, 1952, Serial No. 283,341

4 Claims. (Cl. 97—46.59)

This invention relates to new and useful improvements in farm implements and the primary object of the present invention is to provide a tractor attachment that will dig into the soil and deposit a chemical into the soil, such as anhydrous ammonia, to furnish crops with nitrogen, and thereby increase the production of the crops.

Another important object of the present invention is to provide an agricultural device of the aforementioned character that is quickly and readily attached to or removed from a tractor and which is actuated by the power take-off valve of a tractor to penetrate the ground and form ditches which are filled with a crop aiding chemical.

A further object of the present invention is to provide an attachment for tractors including a stationary frame removably supported at the front end of a tractor, a vertical swingable support member carrying tools and having a portion extending across and in front of the frame, a single cylinder connecting said portion to the support member and constituting a means whereby the support member may be selectively raised and lowered.

A still further aim of the present invention is to provide a tractor mounted liquid applicator very simple and practical in construction, strong and reliable in use, small and compact in structure, efficient and durable in operation, inexpensive to manufacture, assemble and disassemble, and otherwise well adapted for the purposes for which the same is intended.

Other objects and advantages reside in the details of construction and operation as more fully hereinafter described and claimed, reference being had to the accompanying drawings forming a part hereof, wherein like numerals refer to like parts throughout, and in which:

Figure 1:
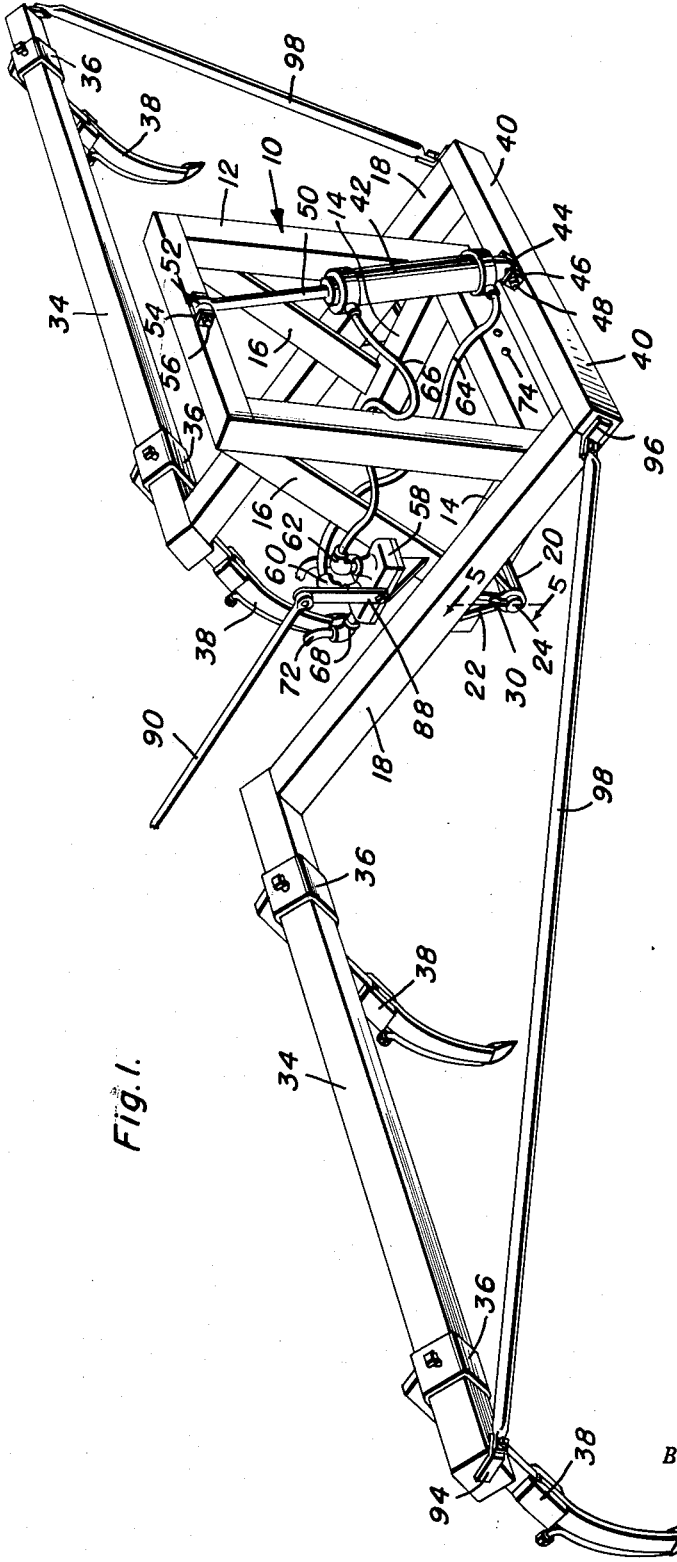
Figure 1 is a perspective view of the present invention removed from a tractor.

Referring now to the accompanying drawings in detail, the numeral 10 represents a rigid frame composed of a substantially rectangular, vertically disposed portion 12 to whose lower corners are fixed, by welding or the like, the forward ends of a pair of rearwardly extending arms 14. The rear ends of the ams 14 are connected to the upper corners of the frame 10 by downwardly and rearwardly inclined brace straps 16.

A pair of spaced parallel, vertically swingable, side members 18 support transverse sleeves 20 intermediate their ends. The sleeves 20 are fixed to plates or gussets 22 which in turn are fixed to the under surfaces of the side members 18. Trunnions or pivot pins 24 extend through the sleeves 20. The outer ends of the pins 24 are provided with transverse apertures 26 that register with the apertures in ears 28 fixed to the outer walls of the members 18. Cotter pins 30 extend through the ears 28 and the apertures 26 to removably secure the pins 24 in the sleeves 20.

Bearing rings 32 are fixed by welding or the like to the outer walls of the arms 14, intermediate the ends of the arms 14, and these rings rotatably receive the inner ends of the pins 24, whereby the side members may swing vertically.

The inner ends of a pair of horizontally disposed coaxial tool supporting beams 34 are permanently fixed to the rear ends of the side members 18 and slidably receive the attaching clamps 36 of ground penetrating tools 38. The forward ends of the side members 18 are connected together by a cross-bar 40 whose ends are preferably welded to the forward ends of the side members 18, whereby the side members may swing as a unit with the pins 24 rotating in rings 32.

A cylinder 42 is provided with an ear 44 at its lower end that is pivotally held between a pair of ears 46 fixed to cross-bar 40 by a fastener 48. Cylinder 42 includes a piston rod 50 whose upper eye end 52 is pivoted between ears 54 fixed to the upper portion of frame 10 by a fastener 56.

A valve 58 is supported on one of the straps 16 and includes a pair of nipples 60 and 62 that are connected to the lower and upper ports of the cylinder 42 by flexible conduits 64 and 66. The intake nipples 68 of the valve 58 are connected to a pump 70 by conduit 72 and the pump is suitably operatively connected to the power take-off shaft (not shown) of a tractor T.

The vertically disposed portion 12 is formed with apertures 74 for receiving bolts 76 that are threadingly received in apertures in the forward end of the tractor T to support the frame 10 stationary on the tractor.

A tank 78 is supported at the rear end of the tractor T through the medium of axle mounting brackets 80. The outlet of the tank 78 is connected to a valve 82, supported on the right side of the tractor, by a conduit 84. The valve 82 in turn is provided with a plurality of supply hoses 86 having removable forward sections 87 that are suitably held relative to and extend downwardly behind the tools and terminate at the lower ends of the tools for supplying a chemical into ditches formed by the tools.

The valve 58 is provided with an operating arm 88 and an operating bar 90 pivoted at its forward end to arm 88. The bar 90 is slidably received by a guide 92 attached to the side of the tractor and extends to a position accessible to a driver on the seat of the tractor.

Means is provided for bracing the beam 34 to the forward ends of the side members 18. This means comprises angle brackets 94 fixed to the outer ends of the beams 34, angle brackets 96 fixed to the forward ends of the members 18 and diagonal brace rods 98 terminally removably secured to the brackets 94 and 96.

In practical use of the present invention, when the tractor T is in operation, it is merely necessary to push forward upon the operating rod 90 in order to move the valve 58 to its open position whereupon the cylinder 42 will cause an upward pull on cross-bar 40 and effect a downward swinging movement of the rear ends of the side members 18 and the beams 34. As the beams 34 are moved downwardly, the tools 38 will penetrate the ground.

With the tools 38 in their ground penetrating position the operator of the tractor then actuates the control handle of the valve 82 so that a chemical, such as anhydrous ammonia, in tank 78 will pass through hoses 86, 87 and into the ditches formed by the tools 38.

Figure 2:
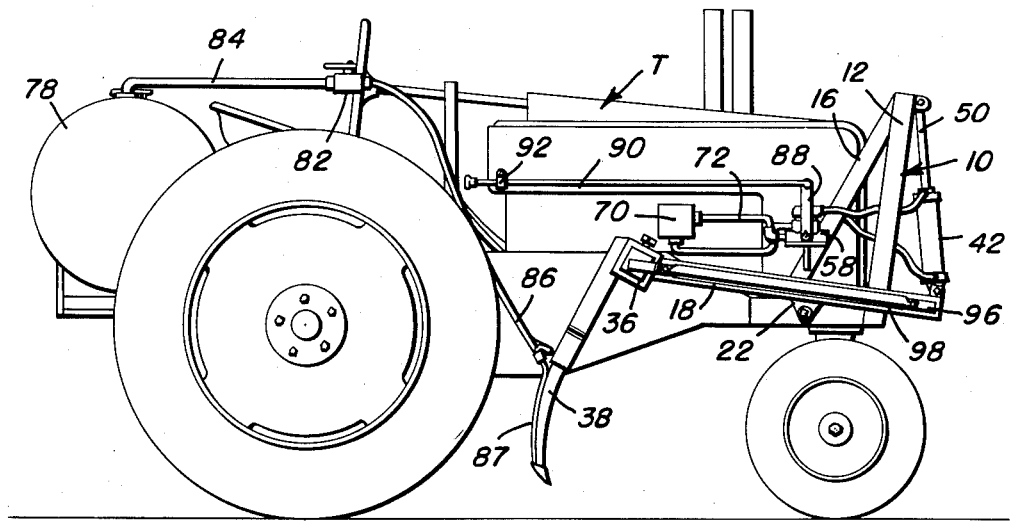
Figure 2 is a side elevational view of a tractor and showing the present invention attached thereto and in its inoperative position.
Figure 3:
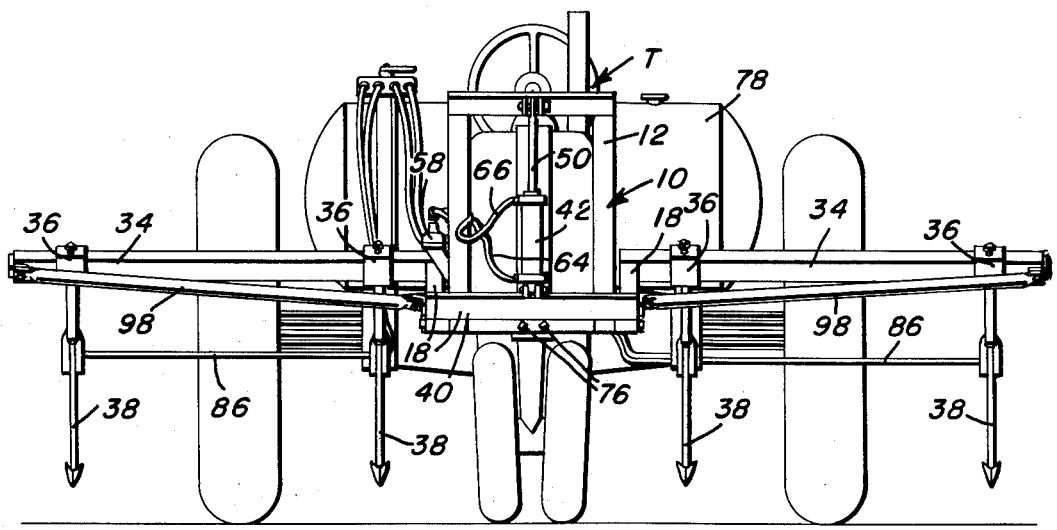
Figure 3 is a front elevational view of the device of Figure 2.
Figure 4:
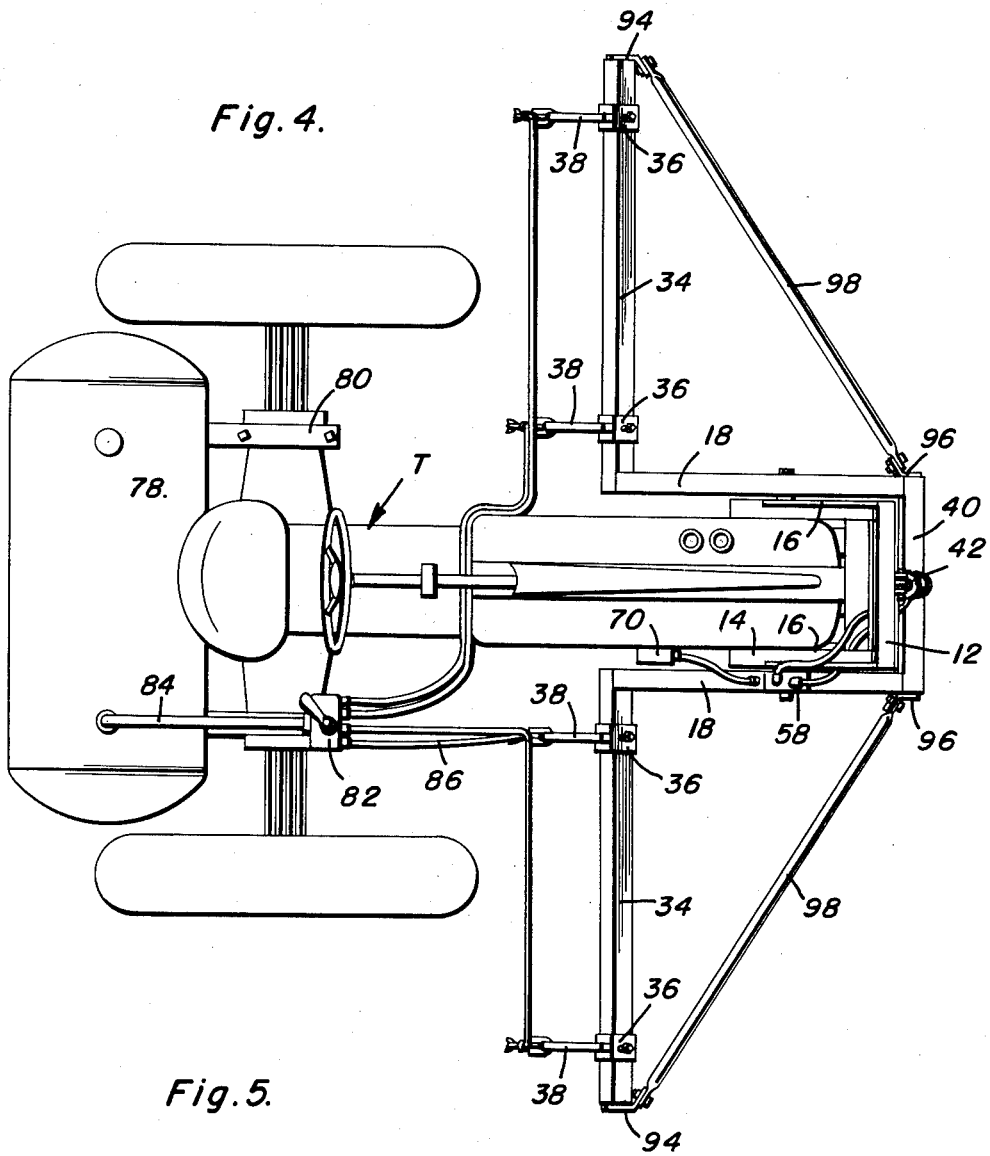
Figure 4 is a top plan view of the device of Figure 2.
Figure 5:
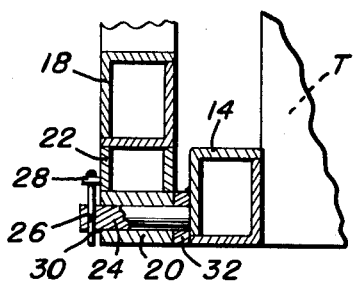
Figure 5 is a detailed vertical sectional view taken substantially on the plane of section line 5—5 of Figure 1.

When rod 90 is released, the valve 58 will be in its closed position and cylinder 42 will be actuated to force cross-bar 40 downwardly and effect a raising of the rear ends of the side members 18 and the tool supporting beams 34, to the position shown best in Figure 2 of the drawings.

Any suitable means may be employed for directing the chemical in tank 78 outwardly therefrom and through the conduit 84 and hoses 86, 87. For example, a small pump operatively connected to the power take-off shaft of the tractor, may be in communication with the tank 78 or the tank 78 may be filled with a chemical, under pressure, for the purpose of delivering such chemical to the discharge end of hose sections 87.

Inasmuch as the pivots 24 are disposed intermediate the ends of the side members 18, and as the cylinder 42 is disposed at the forward end of the tractor and connected to the forward ends of the members 18, the cylinder 42 will effectively selectively raise or lower the rear ends of the side members 18 as well as the tool supporting beams 34. This arrangement will also permit the tools 38 to penetrate the ground or soil up to approximately 12 inches.

Having described the invention, what is claimed as new is:

1. A tractor attachment comprising a substantially rectangular frame adapted to be mounted in vertical stationary relation to a tractor, a pair of attaching arms fixed adjacent the lower end of said frame, rigidifying braces secured between said arms and said frame, a pair of elongated spaced parallel side members, bearing sleeves secured intermediate the ends of said side members, bearing rings secured intermediate the ends of said arms, trunnions secured in said sleeves and rotatably mounted in said bearing rings whereby said side members may swing vertically, a cross-bar connecting the forward ends of said side members, a fluid cylinder, and a piston in said cylinder, said cylinder and said piston being connected between said cross-bar and the top of said frame.

2. A tractor attachment comprising a substantially rectangular frame adapted to be mounted in vertical stationary relation to a tractor, a pair of attaching arms fixed adjacent the lower end of said frame, rigidifying braces secured between said arms and said frame, a pair of elongated spaced parallel side members, bearing sleeves secured intermediate the ends of said side members, bearing rings secured intermediate the ends of said arms, trunnions secured in said sleeves and rotatably mounted in said bearing rings whereby said side members may swing vertically, a cross-bar connecting the forward ends of said side members, a fluid cylinder, a piston in said cylinder, said cylinder and said piston being connected between said cross-bar and the top of said frame, laterally extending tool supporting beams permanently fixed to the rear ends of said side members, and brace rods extending between the outer ends of said beams and the forward ends of said side members.

3. In a power lift attachment having a fixed arm and a swinging side member, means connecting said side member to said arm and comprising gussets fixed to the undersurface of the side member intermediate the ends thereof, a bearing sleeve fixed on said gussets transversely of said side member, a trunnion extending through said sleeve, an ear on one side of said gussets, said trunnion having an aperture adjacent one end, a lock pin extending through said ear and said aperture, and a bearing ring fixed on the arm, said trunnion extending into said bearing ring.

4. A tractor attachment comprising a substantially rectangular frame adapted to be mounted in vertical stationary relation to the front of a tractor, a pair of parallel attaching arms fixed to said frame adjacent to the lower end thereof, braces secured to and between said arms and said frames, a pair of elongated spaced and parallel side members, bearing sleeves secured intermediate the ends of said side members and located below the bottom surfaces thereof, bearing rings secured intermediate the ends of said arms and disposed on the sides thereof, trunnions disposed in said sleeves and rotatably mounted in said bearing rings whereby said side members may swing vertically, means connected to said trunnions retaining said trunnions in said sleeves, a crossbar connecting the forward ends of said side members, a fluid cylinder provided with a piston and connected between said crossbar and the top of said frame, laterally extending tool supporting beams fixed to the rear ends of said side members, and braces extending between said beams and said side members in order to support said beams.

References Cited in the file of this patent

UNITED STATES PATENTS

| | | | |
|---|---|---|---|
| 1,834,667 | Wood | Dec. 1, | 1931 |
| 2,111,453 | Lange | Mar. 15, | 1938 |
| 2,156,571 | Lindgren et al. | May 2, | 1939 |
| 2,168,099 | Hawkins et al. | Aug. 1, | 1939 |
| 2,274,769 | Zink et al. | Mar. 3, | 1942 |
| 2,328,064 | Doty | Aug. 31, | 1943 |
| 2,335,175 | Davenport | Nov. 23, | 1943 |
| 2,346,321 | Mott | Apr. 11, | 1944 |
| 2,375,025 | Mott | May 1, | 1945 |
| 2,415,251 | Leavitt | Feb. 4, | 1947 |
| 2,594,284 | Blue | Apr. 29, | 1952 |
| 2,598,121 | Hannibal | May 27, | 1952 |
| 2,608,924 | Bywater et al. | Sept. 2, | 1952 |
| 2,614,345 | Lay | Oct. 21, | 1952 |
| 2,637,979 | Pool et al. | May 12, | 1953 |

FOREIGN PATENTS

| | | | |
|---|---|---|---|
| 87,029 | Sweden | Aug. 4, | 1936 |